United States Patent [19]

Baliozian

[11] 4,409,646

[45] Oct. 11, 1983

[54] MULTIPLE-EFFECT LIGHT SOURCE, ESPECIALLY USABLE AS A PROJECTOR FOR PHOTOGRAPHY, MOTION PICTURES AND TELEVISION OR AS A LIGHTING APPARATUS

[76] Inventor: Mardick Baliozian, 15, route de Val Martin, Sainte-Gemme, F-78810 Feucherolles, France

[21] Appl. No.: 224,798

[22] Filed: Jan. 13, 1981

[30] Foreign Application Priority Data

Sep. 11, 1980 [FR] France .............................. 80 19612

[51] Int. Cl.³ ............................................. F21V 17/02
[52] U.S. Cl. ..................................... 362/319; 362/17; 362/18; 362/293; 362/301; 362/320; 362/346; 362/367
[58] Field of Search .................... 362/17, 18, 290, 292, 362/293, 297, 300, 301, 342, 346, 367, 319, 320

[56] References Cited

U.S. PATENT DOCUMENTS

| | | | |
|---|---|---|---|
| 2,993,986 | 7/1961 | Pleet .................................... | 362/301 |
| 3,586,851 | 6/1971 | Rudolph .............................. | 362/293 |
| 3,737,226 | 6/1973 | Shank .................................. | 362/16 |
| 3,937,948 | 2/1976 | Allison ................................ | 362/300 |

*Primary Examiner*—Donald P. Walsh
*Attorney, Agent, or Firm*—Young & Thompson

[57] ABSTRACT

A light source usable as a projector for photography, motion pictures, television, or as a light panel, or as a lighting apparatus. This light source comprises a polyhedric housing constituted by a rectangular back 2, two trapezoidal lateral sides 4 inclined to the back 2, two limiting frontal faces 5 closed by translucent sheets, and one central face 10 for accessories such as grid-spots, filters, etc. The back 2 has an opening 3 for a light source, and interior 54 and exterior 80 reflectors are articulated on the back 2. This device makes it possible to vary the characteristics of the light source, notably its intensity, the angle lit, its color saturation, the contrast, the shadow sharpness, the reflections, etc., so as to obtain the desired effects. It is light in weight and inexpensive.

2 Claims, 17 Drawing Figures

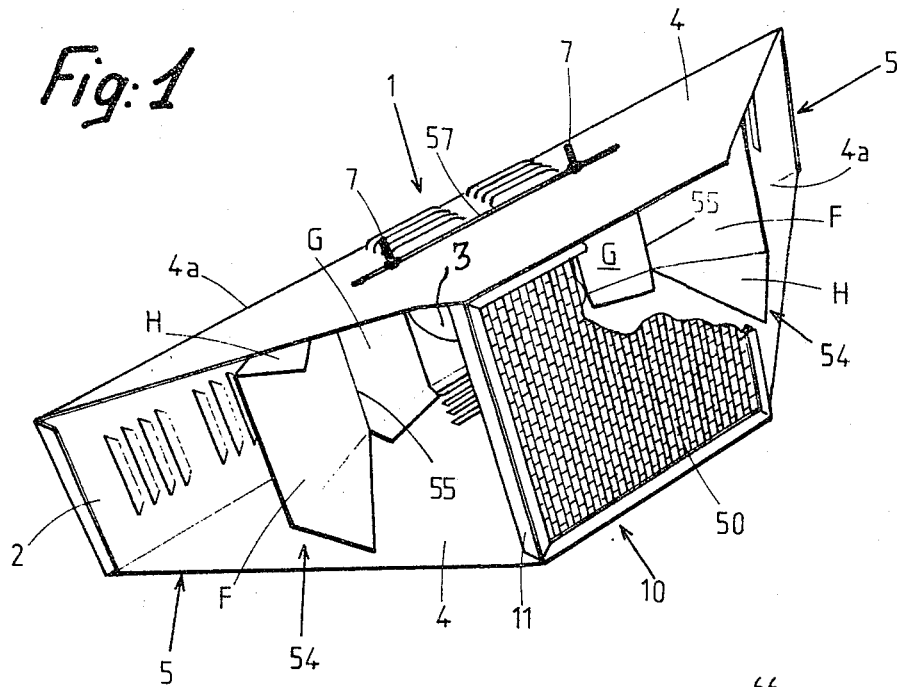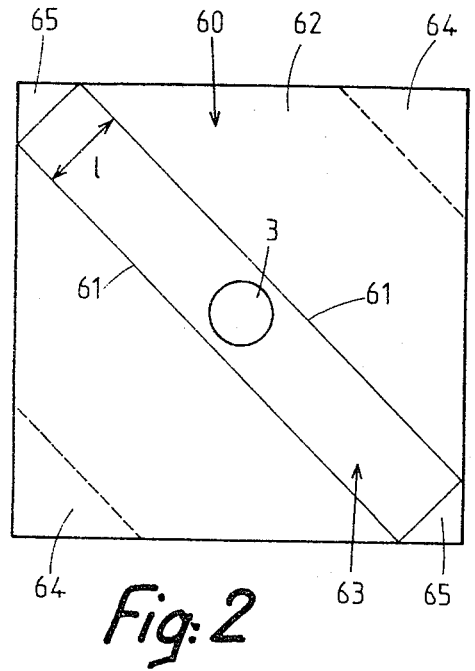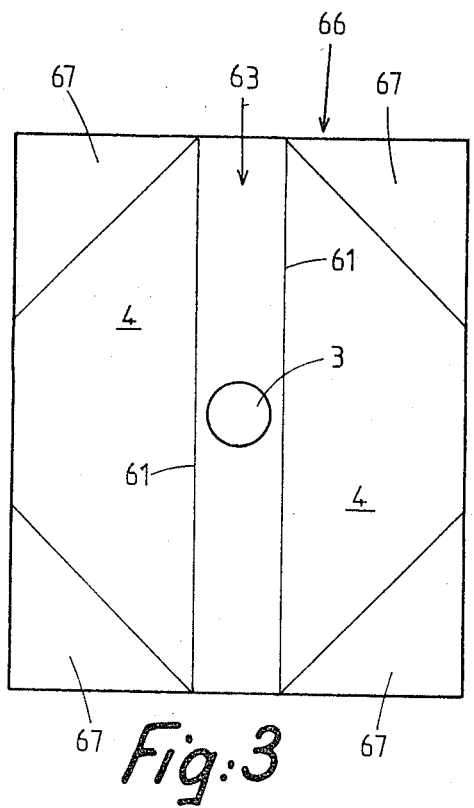

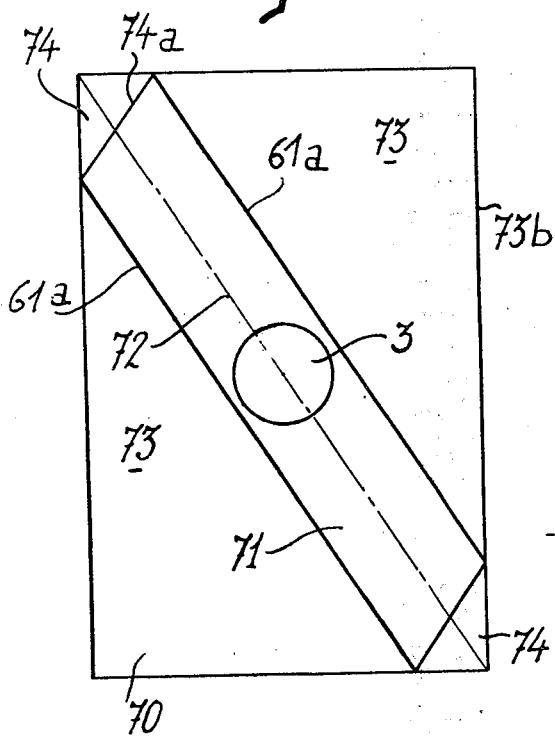
Fig: 4
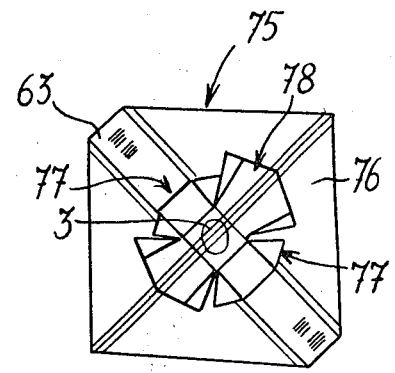
Fig: 15
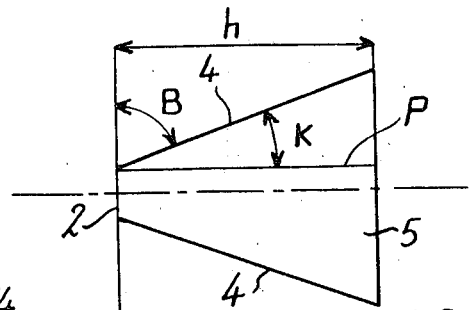
Fig: 12
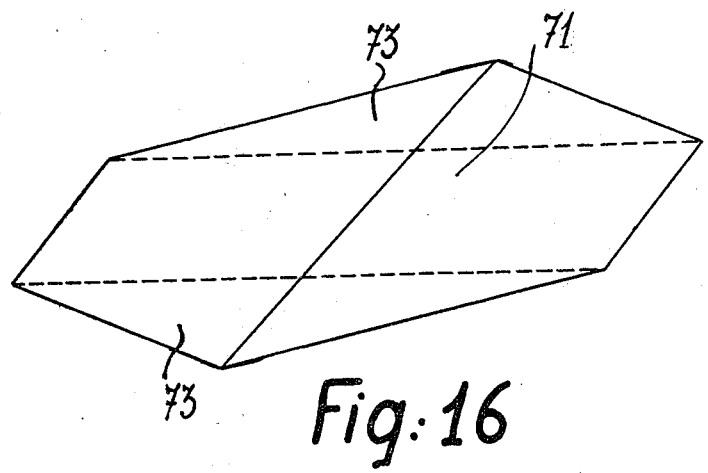
Fig: 16

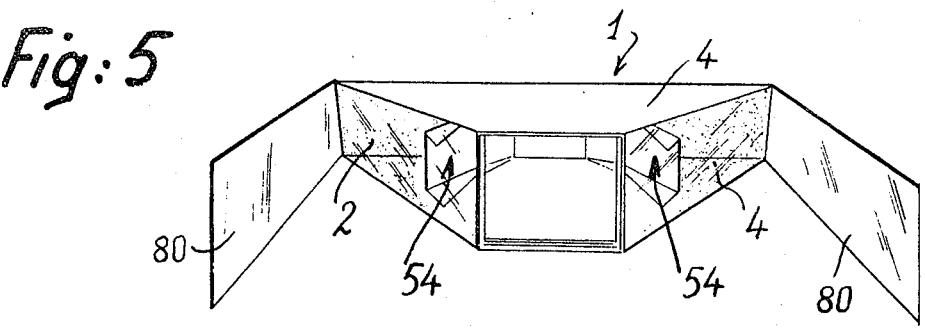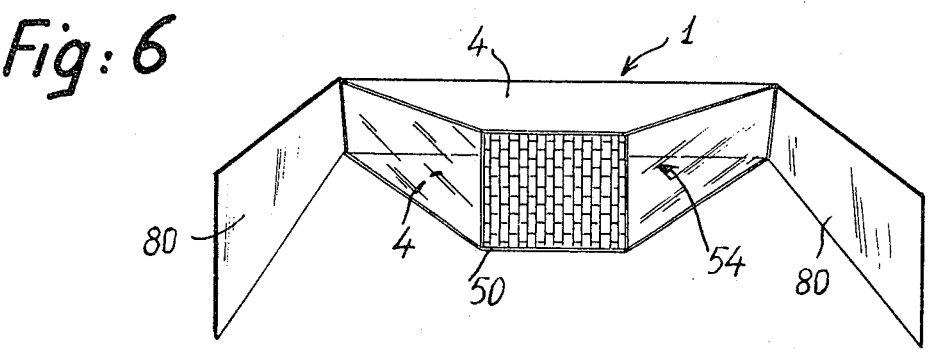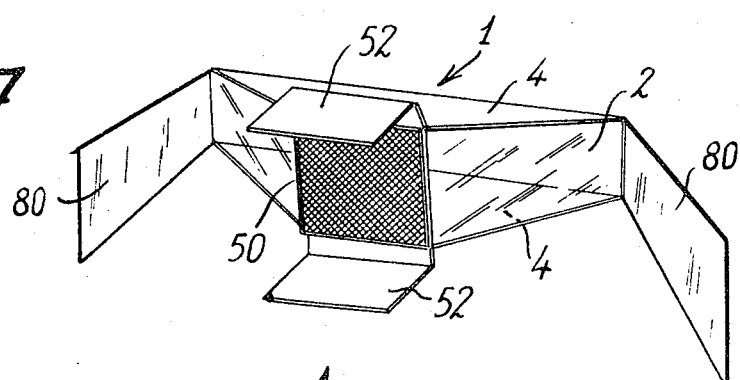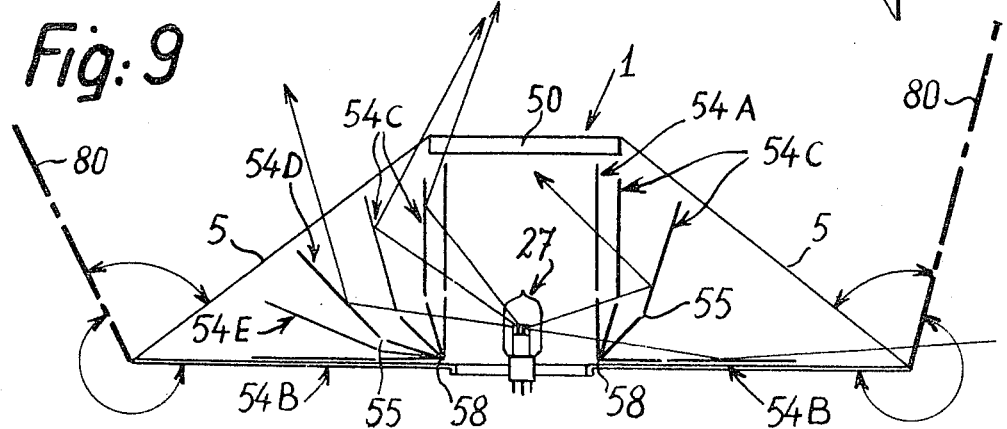

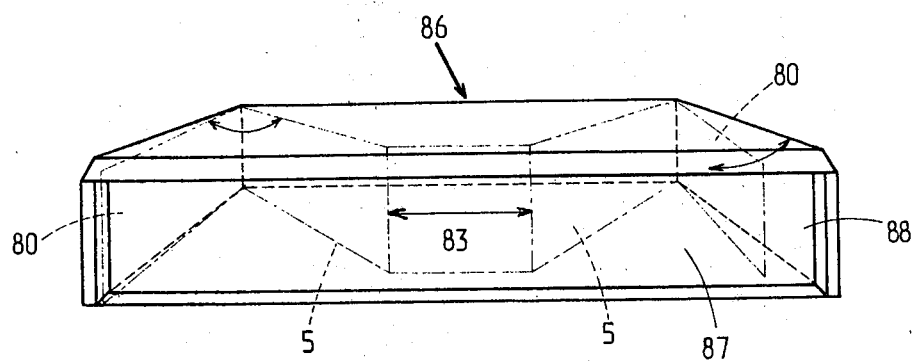
FIG_17

MULTIPLE-EFFECT LIGHT SOURCE, ESPECIALLY USABLE AS A PROJECTOR FOR PHOTOGRAPHY, MOTION PICTURES AND TELEVISION OR AS A LIGHTING APPARATUS

This invention relates to a device constituted by a light source usable as a projector for photography, motion pictures or television, or as a lighting apparatus, or as a light panel as well as a manufacturing method of such a device.

It is already known that lighting devices or "projectors" used for motion pictures, photography or television generally have a square or circular front face. Also, if a subject is placed in front of these projectors, the rotation of the projectors on their axis does not modify the shadow projected on the background by the subject.

It is also known that light coming from a plane surface light source decreases with the cosine of the angle between a perpendicular to the plane of the lightsource and the latter, when the subject which is being lit moves laterally in front of the source until it reaches the plane of the light source. In other words, the light received by the subject, which is at its maximum in front of the light source, fall close to zero when the subject is on the side and in the plane of the light source.

It is also known that each light source has its own characteristics with respect to:
1. light intensity,
2. its colour and eventually the degree of saturation of only one colour,
3. the angle lit,
4. the contrast in lighting,
5. the sharpness of the shadow projected behind the subject,
6. the brilliancy of the reflections,
7. the size of the reflections.

The aim of the invention is to achieve a lighting device capable of varying at least one, several, or all of the aforementioned characteristics. Thanks to its unique conception, this apparatus also reduces the decrease in light with the cosine of the angle lit.

The device under consideration is made up of a polyhedric housing composed of four to seven planar surfaces with rectilinear edges, of which at least one part is translucent or opaline, the other surfaces being opaque and reflecting, and one of the surfaces, constituting the back is equipped to receive a light source.

In accordance with the invention, at least two of the translucent or opaline surfaces are inclined both with regard to the back as well as with regard to each other, or they can eventually be simply perpendicular to the back so as to be visible in a direction parallel to the back.

In accordance with one embodiment of the invention, the device comprises a rectangular back eventually pierced with an opening in order to insert the light source, two triangular sides attached to the long edges of the back and inclined at a prechosen angle with respect to the plane of this back, and a translucent light-diffusing sheet, enclosing the front surface of the volume created by the back and the two triangular lateral sides, it being attached to the sides of the triangular lateral sides, which are, as is the back, made in an opaque and light reflecting material.

In another embodiment, the device in accordance with the invention comprises two lateral trapezoidal, polygonal or curved sides, connected to a rectangular back and inclined at a specific angle with respect to the latter, at least two translucent or opaline front faces which are inclined or perpendicular to the back, and one rectangular or square central face linking said frontal faces.

In accordance with a distinctive feature of this embodiment, the front face placed between the inclined translucent faces is provided with accessories such as grid-spots, diffusers, filters.

In accordance with another distinctive feature of the invention, the device is supplied with at least two reflecting flaps mounted on both sides of the light source inside the housing and articulated on the back between the lateral sides, so as to be pivoted between two extreme positions, namely a first position in which they lie against the plane of the back and a second position in which they are placed at an angle to the back, means being provided to pivot these reflectors so as to place them in the desired angular position and to lock them in this position.

In accordance with another embodiment of this invention, the polyhedric housing also has exterior reflecting flaps placed on both sides of the extremities of the back so as to reflect the contiguous translucent face. Each reflecting flap pivots on an axis, thus permitting its angle with the translucent facet to be varied and also permitting it to be shut against said translucent face.

In a different embodiment, the device under consideration comprises a tetrahedric housing of which at least one face is opaque and light reflecting and equipped to receive a light source inside this tetrahedron, the other faces being translucent.

This device can be used for example as a lighting apparatus in living quarters, since the translucent faces spread out the light of the lamp placed inside the housing.

The dimensions and the geometry of the projectors which can be constituted by the aforementioned devices are choosen depending on the specific effects desired. One understands better these effects if one bears in mind the following observations:

When a light source is kept at a constant distance from the subject it is lighting, the shadow projected on the background by the subject is all the sharper as the light source is smaller. Conversely, the shadow projected by the subject is all the more diffused as the light source is greater in size. If the length and the width of the light source are practically equal so that the source is symmetric (round or square for example), the projected shadow will have the same sharpness, independently of the rotation of the light source. However, if one lights a vertical cylindrical object with an asymmetrically faced light source, the shadow projected by the object will be sharper if the light source is rotated around its axis so as to be parrallel with the longitudinal axis of the subject. If one then rotates the light source, one notices that the sharpness of the shadow progressively becomes more diffused, the maximum diffusion being obtained when the greater dimension of the light source is perpendicular to the vertical cylinder constituted by the object.

The projector described in this invention therefore permits, contrary to customary projectors, to obtain varied light effects as far as the sharpness of the subject's shadow on the background is concerned, both by rotating the light source around its axis as well as by varying the effective length of the light source.

In one embodiment of the manufacturing process in accordance with the invention, one takes a rectangular sheet, and draws on it the edges of the back part, placing the lines at a chosen angle with respect to the diagonal of the rectangle, then one bends the sheet along the traced edges of the back so as to obtain two lateral surfaces bent at a desired angle to the back, one completes the housing by forming two frontal faces in a translucent diffusing material that one attaches to the sides of the aforementioned lateral slides.

This manufacturing process is particularly simple and economical when the back is placed diagonally in the rectangle, as far as the waste in material is concerned (normally inferior to 5%) and requires minimum labour. As an example of material that can be used, one can mention polypropylene, the two folded sides of the bottom part acting as a hinge permitting both lateral sides to be folded flat with the bottom part.

Further distinctive features and advantages of the invention will become apparent from what follows. Several embodiments of the lighting device and of its manufacturing process are illustrated in the accompanying drawings which are given by way of example and not in a limiting sense, and in which:

FIG. 1 is a perspective view of a first embodiment of the projection device in accordance with the invention, notably for photography, motion pictures and television.

FIG. 2 is a plan view showing the first manufacturing method of the device shown in FIG. 1.

FIGS. 3 and 4 are plan views showing two other ways of carrying out the manufacturing method of this device.

FIG. 5 is a reduced scale front perspective view of the device shown in FIG. 1, showing it equipped with outside lateral reflector flaps; and with its central front face empty.

FIG. 6 is an analogous view to FIG. 5 showing the projector equipped with a grid-spot on its center frontal face.

FIG. 7 is a perspective view analogous to FIG. 6 showing the device also equipped with two light absorbing members.

FIG. 9 is a top plan horizontal view of the lighting device shown in FIG. 1, showing in particular the interior reflecting flaps used in this device, as well as the two exterior reflecting flaps.

FIG. 12 is a cross section view of the projector shown in FIG. 1.

FIG. 15 is a front plan view of one form of projector made in accordance with the invention, in which it is equipped with four interior reflecting flaps.

FIG. 16 is a front plan view of the housing obtained by using the procedure illustrated in FIG. 4.

FIG. 17 is a perspective view of the device shown in FIG. 11 placed within an outer casing.

Figure 8:
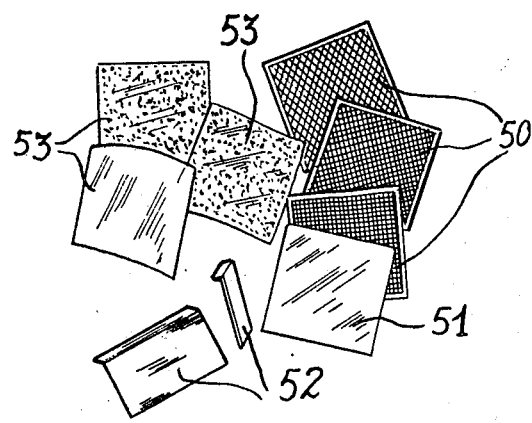
FIG. 8 is a perspective view showing different accessories which fit directly on to the lighting device illustrated in FIG. 1.

Referring to FIG. 1, one sees a device constituted by a multiple-effect light source, especially usable as a projector for photography, motion pictures and television, but which can also be applied to other uses, for example as a light panel with specific indications applied to its front surfaces.

This lighting apparatus, indicated under general reference 1, comprises a rectangular back 2 pierced with an opening 3 so as to be able to accept a non-represented light source, two lateral sides 4 formed by trapezoids which are contiguous with the long sides of back 2 and bent at a desired angle in respect to the plane of the back. The device also has two light-diffusing translucent sheets made of material (not shown in order to make the drawing more readable) which partially enclose the open volume defined by back 2 and by the two trapezoidal sides 4. Central face 10 is thus disposed between the two translucent sheets. In the illustrated example, it is square but can also be rectangular. A transparent frame 11 can outline face 10, acting thus as a spacer strut and also as a receptable for grid-spots, filters and diffusers. Translucent sheets 5 are attached to the sides of the two trapezoids 4 by known, appropriate means; trapezoids 4 and back 2 are made in an oqaque but light-reflecting material such as a light metal alloy, or an appropriate plastic material.

The angle of trapezoidal sides 4 with respect to back 2 can vary: for example the two sides 4 can be placed in such a position as to form an angle greater than 90° with back 2, thus being slightly divergent.

The two translucent surfaces fixed onto sides 4 are thus inclined at an angle to back 2, as well as inclined one towards the other, so that they are thus visible laterally in a direction parallel to back 2.

In the example illustrated in FIG. 1, trapezoidal sides 4 and back 2 are obtained in one single piece from one sheet simply by bending trapezoidal sides 4 on each side of back 2.

Central frontal face 10 disposed between the two translucent frontal faces 5, can advantageously be equipped with accessories such as grid-spots 50 (FIG. 8) in black or grey honeycombs giving lighting angles varying from 10 to 40 degrees, removable diffuser 51, two removable light absorbant members 52 (FIG. 7 and 8), a different coloured filters, or polarizing filter 53.

In accordance with a specific feature of the invention, the light source constituted by the lighting device represented in FIG. 1 is provided with two interior reflecting flaps 54 mounted on both sides of the central light source, and articulated on back 2 between lateral sides 4. Each of these mirror flaps 54 is, in the illustrated example, constituted preferably of at least two elements F, G, articulated together around a geometric axis 55, so as to be able to change their relative positions when going from one extreme position to the other. Top element F is provided with two lateral wings H.

Thus one can see in FIG. 9 a first position of these reflecting flaps referenced 54A in which they are perpendicular to the plane of back 2, and a second position 54B in which they lie flat against back 2, means being provided to manipulate these flaps so as to place them and keep them in the chosen angular position. FIG. 9 also shows various intermediary angular positions 54C, of reflecting flaps 54, in which one can see that the top element F of each flap pivots with respect to the lower element G around axis 55. This permits it not to rub against the corresponding translucent face 5, and to give a different angle inclination to the two parts of each flap, so as to reflect the light in a more efficient way.

In the illustrated example, reflecting flaps 54 are provided with lateral wings H, inclined with respect to sections F, and have in a way a "variable geometry", due to the articulation between the two sections F, G, around the intermediate hings 55. 27 represents the light source inserted through opening 3 of back 2, and suitably attached to it in a known way; one sees that the light beam emitted by this source can go out in different directions depending on the angular position of flaps 54, the direction of the light beams reflected by flaps 54 being represented by continous lines.

In the example illustrated in FIG. 1, the reflecting flaps 54 are controlled by rods (not shown in FIG. 1); each of these rods fits into flap 54 by passing through slot 57 pierced in one of lateral sides 4 or back 2; the to-and-fro motion of a rod in slot 57 causes the rotation of the corresponding flap 54 around a transverse axis 58 (FIG. 9) on back 2. Each of these flaps 54 can be locked into the angular position selected by simply tightening exterior control nut 7 thus locking the rod in slot 57. Of course, other types of control and locking systems for flaps 54 can be used.

When the flaps are in the concentrated light position, close to each other in front, and if the diffusing frontal face (10) can easily be removed, one can double or triple the amount of light.

Inclined wings H are used to increase the reflection of the light by elements F and G.

The lighting device thus obtained, can receive a light source capable of being introduced through opening 3, and equipped with a cylindrical sleeve (not shown) attached exteriorly to back 2 and coaxially to opening 3. This sleeve slips onto a fixture (not shown), around which it can pivot, correlatively giving the projector different inclinations. If the sleeve's axis is horizontal, the projectors can then pivot around a horizontal axis.

In accordance with three possible manufacturing methods (FIGS. 2, 3, 4) one takes a square 60 or a rectangular sheet 66 or 70, one draws on it edges 61 of back 63, placing them at a selected angle with respect to the diagonal of the rectangle or the square sheet, one then bends sheets 60, 66 along edges 61 of back 63 so as to obtain two lateral surfaces 62, 4, 73 which can be bent at a chosen inclination with respect to back 63; for example angle K (FIG. 12) which can be variable. One then completes the housing by forming the frontal faces with a translucent diffusing material, that one assemblies to the sides of the lateral sides 62, 4, 73.

In the case illustrated in FIG. 4, lateral sides 73 are triangular, in FIGS. 2 and 3, faces 62, 4 are trapezoidal after having cut off corners 64, 67.

One cuts off at the extremities of back 63 (FIG. 2) two triangles 65, the bases of which are equal to the width 1 of back 63. In the case illustrated by FIGS. 2 and 4, edges 61 of back 63, 71 are parallel with the diagonal of square 60 and of rectangle 70. Finally, in all three cases, one cuts out in backs 63 and 71, holes 3 made for the light source used in the projector; the housing obtained from FIG. 4 is illustrated in FIG. 16.

It is also possible not to cut the four corners 67 (FIG. 3) thus obtaining two rectangular lateral sides instead of the trapezoidal sides 4 thus making the two translucent lateral sides perpendicular to bottom part 63.

It has already been indicated that one can control the degree of shadow sharpness by revolving the asymmetric projector around its support, so as to change the effective width of the light source in relation to the subject. The interior 54 and exterior 80 reflecting flaps (FIGS. 10, 11) can be used for that same purpose, because when actuated, one varies the effective length of the lighting device. These flaps are also used to vary the light power, to vary the brillancy and the size of the reflections, to control the colour saturation of the subject, as well as to permit the use of the projector with accessories having dimensions smaller than the total length of the projector such as light-absorbant members 52 (FIGS. 7 and 8), grid-spot 50 (FIGS. 6,7,8), polarizing filter or colour filter 53 (FIG. 8).

Moreover, flaps 54 and 80 furnish a precise way of varying the effect of the filters, that is to say of varying the colour saturation of the light or the degree Kelvin of the light. This is due to the following reasons:

When flaps 54 are placed in the concentrated position 54A, (FIG. 9) that is to say when the two sections F, G, are one in the prolongation of the other and perpendicular to back 2, all the light goes through a filter placed on the front square face 10. Also, when the two flaps 80 are placed against the two translucent faces 5, light can only come out through central face 10.

As one opens flaps 54 towards the intermediate positions 54C, 54D, one lets the non-filtered light come out of the projector through the translucent or opaline faces 5, without going through the central filter, thus diluting (or desaturating) the light filtered by the filter. The same thing also happens as one opens exterior flaps 80.

In like manner, one can vary the contrast of the lighting, for if reflecting flaps 54 are placed in the concentrated position 54A, all the light is concentrated onto the subject. It is also possible to reduce even more the angle of lighting by adding grid-spots 50 or light-absorbant members 52 attached to the front face of the projector. One thus obtains a light that is high in contrast, very directional and coming from a relatively small size source. Very little light lights the shadows and the surroundings. Now as one progressively opens reflecting flaps 54, one lights up more and more a growing angle with a more diffused light coming from a surface increasing in size. At the same time, one reduces the amount of direct light coming from the central area. Thus, contrast progressively decreases and shadow sharpness becomes more and more diffusd. Finally, it is possible to add the diffuser in front of the central part to increase this progression.

Reflecting flaps 80, preferably having a shiny aluminum surface, and having dimensions similar to those of the two translucent faces, also permit the contrast to be varied by first of all letting more or less light come out of translucent faces 5 and secondly by reflecting towards the subject part of that light, thus lightening the shadow behind the subject.

If the angle of inclination of the lateral sides is open enough (about 45°), one can better control the light with four interior reflecting flaps 77, 78 (FIG. 15).

In effect, by using four reflecting flaps 77 and 78, one can reflect more light towards the subject than with just two flaps such as 77.

If a diffusing surface is mounted on frontal face 10, by actuating flaps 80, one changes the effective length of the light source from 83 (FIG. 11) (length of face 10) to 84 (length of bottom part 2) and up to 85, thus giving a more and more diffused shadow and vice-versa. The greater the ratio between 83 and 85, the greater the variation in the sharpness of the shadow behind the subject.

It is also possible to reflect (FIG. 10) the light beams coming from the two lateral faces 5, either directly in front (81A), or making them converge towards an axial point (beams 81B) or towards another point elsewhere 81C. Each reflecting flap can be independently set. The orientation of these two flaps 80 also changes the brillancy and the size of the reflections; the brilliancy of the reflections will be all the stronger and the size of the reflections all the smaller, the smaller is the surface of the light source. Reflecting flaps 54 also control these two attributes of the light.

Flaps 54, preferably made out of shiny aluminum, can be actuated either both at the same time, or independently from each other by means known per se such as those illustrated in FIG. 1, with a locking system such as by nuts 7 hereinbefore mentioned (FIG. 1). The position of the flaps can be clearly indicated on the exterior of the light box constituted by the projector, so as to permit one to place them exactly at the right location.

The flaps can also be simple rectangles instead of the two element assembled with lateral wings H hereinbefore described. However, one obtains more light output by increasing their width with their distance from light source 27, and by shaping the flaps so as to give them a profile permitting them to lie down completely against back 2 and lateral sides 4.

It is however, advantageous to make each reflecting flap in several sections such as F, G, H, so as to collect the maximum amount of light and give the whole flap a variable geometry, the two main sections F and G being articulated relative to each other. This type of device has many advantages:

(1) The profile of the flap can, when the two sections are in the concentrated position such as in 54C (FIG. 9), resemble the profile of a parabolic reflector, thus furnishing more light.

(2) In the final position when the flap is placed in the maximum closed position in front (position 54A), it is desirable that the flaps should not let the light come out from elsewhere other than from the front rectangular or square face 10.

(3) In the totally open position 54B, the elements of each flap lie against back 2, and do not hinder the passage of the light beams that will come out through the opposite sides of the projector.

With flaps 54 in the narrow angle position, and with the central face 10 open, it is possible to reduce the angle and to increase the light (while reducing the angle lit) by placing an additional reflector housing in frame 11 of central face 10.

Seen from the side, the device has a trapezoidal section, the opening of which depends on the inclination of lateral sides 4 to back 2.

With central face 10 equipped with the diffuser and flaps 54 placed against back 2 and flaps 80 placed behind the plane of back 2, the lateral lighting with respect to the axial lighting is the ratio between the depth h (FIG. 12) and the Length 84 (FIG. 11) of back 2, this ratio remaining preferably between 0.3 and 0.5.

Figure 13:
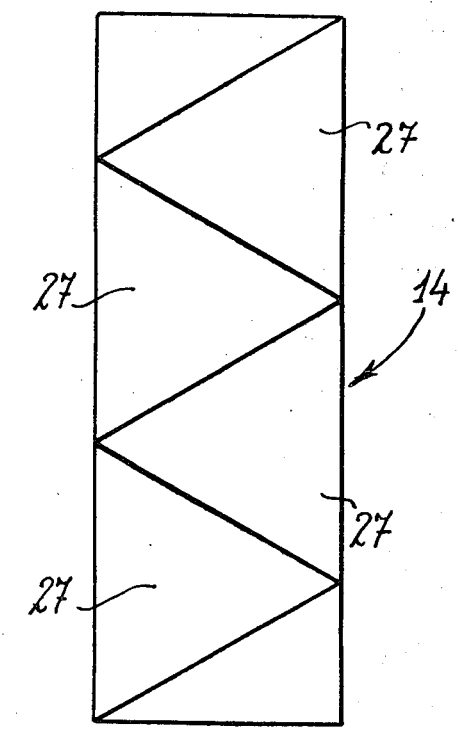
FIG. 13 is a plan view of a strip with which one can make up a tetrahedric housing to be used for example as a lighting apparatus.
Figure 14:
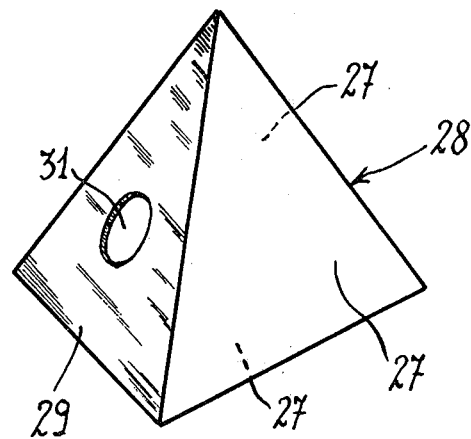
FIG. 14 is a schematic perspective view of a tetrahedric housing obtained from a strip such as illustrated in FIG. 13.

FIG. 14 illustrates a third possible embodiment of the light source in accordance with the invention, and FIG. 13 a manufacturing method of this light source.

In accordance with this method, one folds strip 14, made in this case out of a translucent and rigid enough appropriate material, along the sides of four successive isosceles triangles 27. One cuts out the portion of the strip comprising these four isosceles triangles 27, then one folds it along the edges in order to constitute a tetrahedron 28 (FIG. 14) of which one face 29 can eventually be pierced with an opening 31 intended to permit the introduction of a light source into the tetrahedron. Moreover, face 29 can be covered with an interior opaque and reflecting coating, and the same thing can eventually be done to a second face of the tetrahedron.

The device thus obtained can be used as a light panel or as a lighting apparatus in living quarters or in halls or corridors, as this lamp sends light through the three translucent sides of the tetrahedron.

It is possible this way, in a strip 14 of a specific length, to cut out a series of isosceles triangles, of specific dimensions and to constitute as many tetrahedrons as there are consecutive groups of four isosceles triangles.

The invention is not limited to the hereinbefore described embodiments of the lighting device and the corresponding manufacturing methods, and it can accordingly extend to alternative forms of construction. Thus, in a more general way, the light source for the use as a projector or a lighting apparatus in accordance with the invention comprises a polyhedric housing formed of four to seven plane surfaces with rectilinear edges of which at least one part is translucent or opaline, the other surfaces being opaque and reflecting. An alternative construction could consist in making a housing formed of four surfaces of which one is translucent or opaline to permit the outward spread of light, having curved shaped sides which correspond with the curved sides of the translucent surfaces; the fourth surface constituting the bottom part is pierced in order to permit the introduction of the light source.

However, projectors thus constructed have a higher cost, because they require either special moulds, or special cutting tools. Such projectors have a bulging and translucent or opaline light surface, and can be equipped so as to receive the same control elements and the same accessories as those hereinbefore described.

As a general rule, at least two of the translucent or opaline surfaces are inclined with respect to the base or back, so as to be visible (when one is in the plane of the back and looking towards the edge of the back); this avoids the light decreasing with the cosine of the angle lit, and permits the exterior flaps 80 to reflect efficiently the light.

When one uses the projector shaped as an equilateral tetrahedron or as a truncated tetrahedron, one can obtain very interesting coloured lighting effects by mounting on the triangular base around the light source, three filtering triangular or trapezoidal flaps and by actuating them. If one uses three filters of primary colours, one will light up each face more or less with one of the three primary colours, thus giving beautiful visual effects and also permitting the variation of the colour resulting from the three faces.

If one uses three filters of complementary colours, by looking at the projector one will have very esthetic visual effects but with no great change in the total colour. It is also possible to use any other choice of filters, as well as a series of opaque flaps, should one wish to eliminate the light coming out of one or the other of the two other translucent faces.

When the device is used as a light panel, the indications inscribed on each translucent side can be easily read from all directions and at greater angle than is possible with customary panels with a single planar surface.

Another advantage of the device in accordance with the invention derives from the fact that it is possible to use in it, normal incandescent lights when being used as a light panel, instead of large size, expensive fluorescent tubes with their ballast bases.

In case one wishes to light a smaller portion of the opaline surface, interior flaps permit one to reduce the width of the area lit with a proportional increase in the light intensity.

Figure 10:
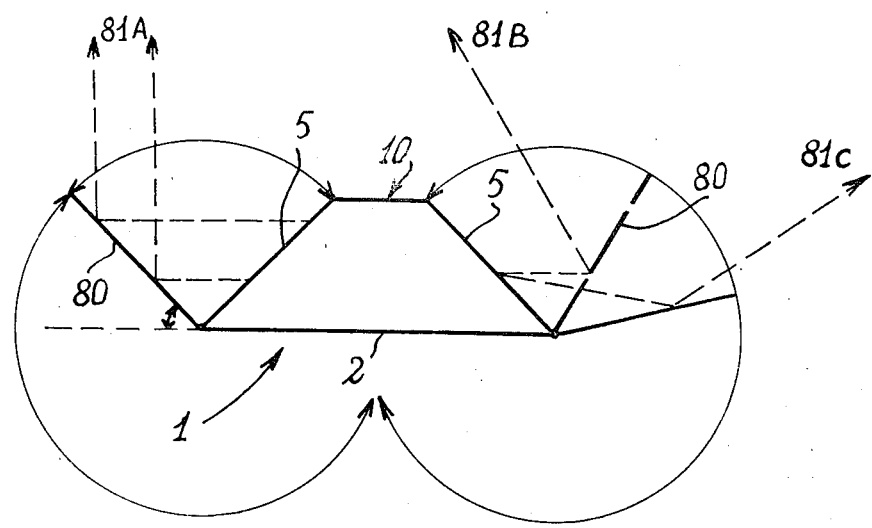
FIG. 10 is a top plan horizontal view of a variant of one form of the device shown in FIGS. 5 and 6.
Figure 11:
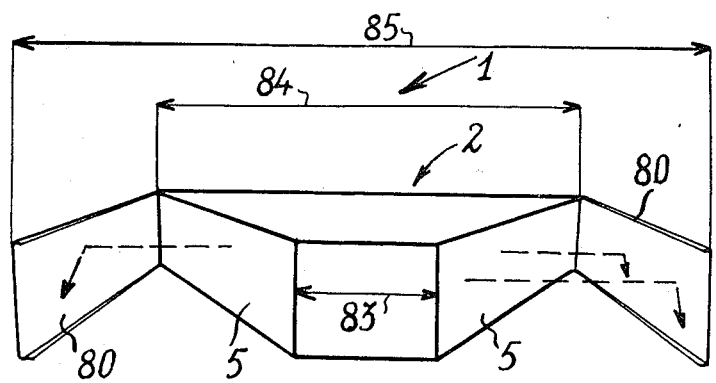
FIG. 11 is a perspective view of the device shown in FIG. 10.

It may be desirable to place the device (complete with the exterior reflecting flaps in any of the selected positions shown in FIGS. 10 and 11) within an opaque outer casing 86, as shown in FIG. 17 having a light reflecting interior 87 and an open or transparent or translucent or opaline rectangular front face 88 which can advantageously be equipped with grid-spots, light filters and other accessories. The lighting device will thus look more attractive and will have a more homogeneous front face when equipped with a translucent or opaline diffuser thus avoiding any multiple shadows. The front to depth ratio is very high and advantageous. In one commercialized form, the casing 86 is made of one single sheet of polypropylene which can be folded flat for transport and then put into three dimensional forms. However, other materials can be used.

I claim:

1. A device to be used with a light source for use as a projector for lighting subjects in photography, motion pictures, or television, comprising:
   a polyhedric housing with a rectangular opaque light-reflecting back,
   two opaque light-reflecting longitudinal sides contiguous with the long sides of said back and disposed at an angle to the plane of said back,
   a central front rectangular side between opposed edges of said longitudinal sides,
   two contiguous inclined front translucent sides each of which is situated between said central front rectangular side and the corresponding extremity of said reflecting back,
   said inclined sides being visible in a direction parallel with the reflecting back,
   two reflecting flaps mounted on opposite sides of the light source inside the housing and articulated on the back between the lateral sides, in order to move from one extreme position to the other, namely a first position where they are at an angle with respect to the plane of the back and a second position where they lie against it, means to control these flaps so as to place them and keep them in the selected angular position, and adjustable exterior reflecting flaps articulated on the edges common to the back and the translucent lateral faces.

2. A device according to one of claims 1, wherein at least two reflecting flaps are mounted on both sides of the light source inside the housing and articulated on the back between the lateral sides, in order move go from one extreme position to the other, namely a first position where they are placed at an angle with respect to the plane of the back and a second position where they lie against it, and means to control these flaps so as to place them and keep them in the selected angular position.

* * * * *